Feb. 22, 1938. W. E. WILLIAMS 2,109,363
COFFEEPOT
Filed Sept. 22, 1934 2 Sheets-Sheet 1

INVENTOR
William Erast Williams

Feb. 22, 1938.                     W. E. WILLIAMS                    2,109,363
                                      COFFEEPOT
                               Filed Sept. 22, 1934                 2 Sheets-Sheet 2

INVENTOR

William Erastus Williams

Patented Feb. 22, 1938

2,109,363

UNITED STATES PATENT OFFICE 2,109,363

COFFEEPOT

William Erastus Williams, Los Angeles, Calif., assignor to The Parfex Company, a corporation of California Application September 22, 1934, Serial No. 745,076

11 Claims. (Cl. 53—3)

My invention relates to coffee pots that are chiefly used in homes for brewing relatively small quantities of coffee, but may be made larger for restaurant and hotel service.

One object of the invention is to provide a glass vessel into which to cook the coffee that will not only stand the direct contact of flame in heating but be easily cleaned and so shaped as to lessen the liability of boiling over in the cooking of the coffee; further to combine in with the above the merit of providing a holding and protecting cage for supporting the glass vessel that may be easily removed from the vessel and to which a handle may be attached.

Another object of the invention is to provide a container or basket for holding the ground coffee in the pot and in varying positions as desired and shaped to facilitate circulation of water thru the grounds held in the container and adapted to float up and down in the water in the pot and be lifted up and anchored in the top cover of the pot.

A further object of the invention is to provide a percolator tube stem with its foot piece and top construction that will not only act as a normal percolator part but will also act as guide in holding the basket or grounds container in a central zone while the latter is immersed in the liquor and floating therein under the boiling action of the liquor when that takes place, and the stem adapted to be used in lifting the basket or container up into the cover in the function of anchoring the basket into the cover.

A further object is to provide efficient mechanisms for anchoring the basket or grounds container to be supported by the cover and be released therefrom.

A further object is to provide a desirable shape for the cover to facilitate the cleaning thereof and for mounting and holding the cover on the pot for facilitating the pouring of the coffee from the pot to avoid slobbering the liquor down the side of the pot.

A further object is to provide a pot that is adapted to permit the user to make coffee flavors simulating the flavors made by the several general different styles of coffee brewing devices now in use. In other words to make a coffee pot that may be called universal as to its uses.

Other objects relate to the details of construction of the parts as will be later described herein.

I attain these objects by the mechanisms and forms illustrated by the accompanying drawings in which—

Figure 7:
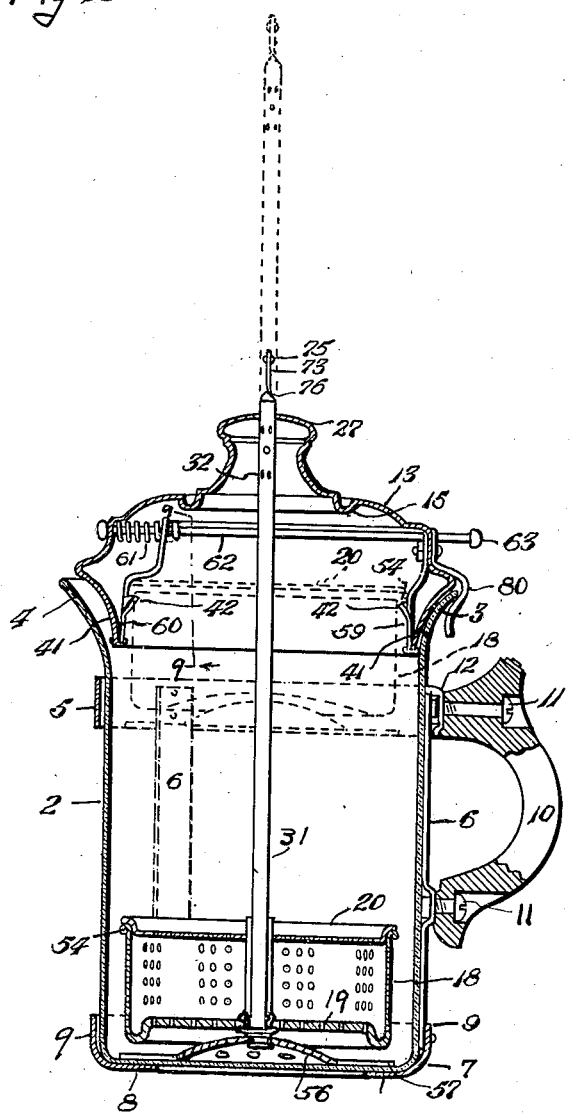

Fig. 7, Sheet 2, is an elevation partly in section of a modified form chiefly in relation to the anchoring means in the cover.

Figure 8:
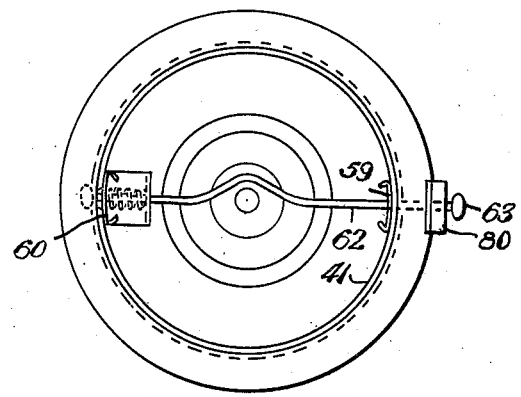

Fig. 8 is a plan of the bottom of the cover as shown in Fig. 7.

Figure 9:
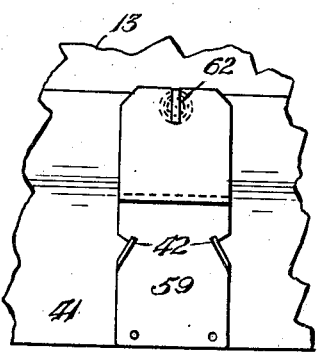

Fig. 9 is an elevational detail on line 9—9 of Fig. 7.

Figure 10:
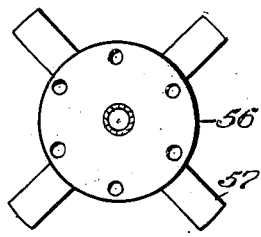

Fig. 10 is a plan of the foot piece of the stem as used in the construction shown in Fig. 7.

The pot is made of glass that is adapted to be used in heating by the action of direct flame or other heating means as indicated by 2. This is shaped in substantially a cylindrical form with a diameter approximately of uniform diameter and at the top the opening is outwardly curved in a slight bell shape indicated by 3. At one point this outwardly curved top edge is pinched outwardly from the main body of the curved edge to form a pouring spout or nozzle 4.

While the glass used in this pot will stand safely to be put with cold contents inside directly on the fire were the pot to have a glass integral handle this feature would contribute to unequal expansion and thus promote cracking and breakage. To handle this glass pot shaped as shown there is provided a metal cage composed of a band 5 extending around the upper portion of the pot. This band 5 is connected by metal strips 6 extending down to an angle annular ring 7 having a flange portion 8 extending inwardly a short distance over the bottom curved corner of the pot and a vertical flange 9 extending up the side of the pot for a short distance. A handle 10 of any suitable form and material is secured to the band 5 and one of the vertical metal strips 6, by bolts 11 fastened into nuts held in clips 12 riveted to the band 5 and one of the vertical strips 6.

Owing to the cylindrical shape of the pot and the special construction of the cage which is self sustaining in shape, the pot may be slid into and out of the cage for any purpose, especially for cleaning the pot and cage separately. In the use of a coffee pot spillings of grounds and coffee liquor commonly happens and at times these spillings and other features of contamination cloud the outside of the pot. The pot being glass and the cage made of bright metal it is highly desirable that the cage be easily removed and replaced from the pot which then makes cleaning an easy matter. Further the angle ring at the bottom of the cage protects the glass from shock contacts in handling together with the fact of protecting the glass from breakage or cracking by sudden uneven contraction when the pot is placed on a cold body such as a tile, concrete, stone or metal surface with the pot in a highly heated state. Further this cage constructed as shown avoids the use of protecting plates and pads commonly used under glass vessels when being heated. With my glass pot and its protecting cage the user need take no more care in handling it than may be used commonly with all metal pots.

The old style house coffee boilers were and are made larger at the bottom and tapering narrower towards the top. This form facilitates the coffee boiling over and since the housewife cannot see thru the wall of the pot the boiling over is a notice of the progress of the cooking of the coffee. With my cylindrical glass pot there is less chance of boiling over as there is no taper to narrow up the space as the steam of boiling enlarges the volume of the liquor of the pot. Then the glass allows the user to see at all times the progress of the cooking in the pot and thus control as desired the heat of cooking.

Coffee is peculiar in the fact that it contains considerable volatile oil that in the cooking fouls the surfaces that are in contact with the liquor in cooking. Glass is the easiest surface to keep clean from coffee cooking. Further the glass shows up where the fouling has taken place.

The cylindrical shape and outwardly curved top of my pot provides the most convenient shape for cleaning. The curved outward top permits the hand to reach inside the pot with less liability of rasping the wrist as it were as compared to the abruptly closed in edge of the top of pots in common use. The ease of cleaning my pots insures a more sanitary situation in the brewing of coffee whereas with old style pots a careless housewife will keep on using a pot without proper cleaning and thus make poor coffee and put the blame upon the quality of the ground coffee used.

Figure 1:
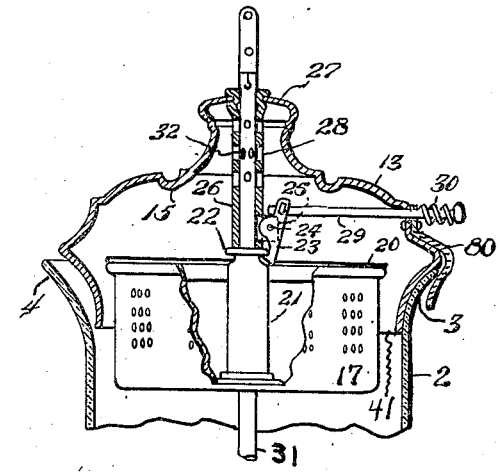
Figure 1 is a sectional elevation of the top of the pot showing the preferred form of anchoring the basket or grounds container to the cover.
Figure 2:
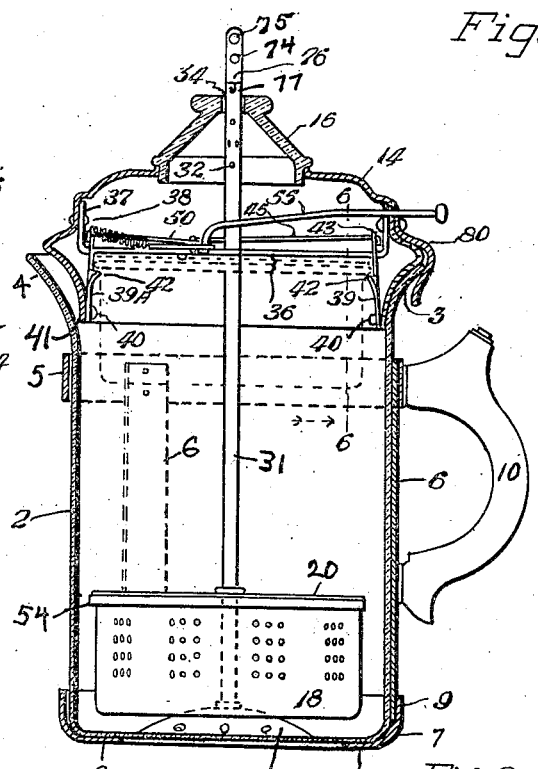
Fig. 2 is an elevation partly in section of the entire pot but with different mechanisms for anchoring the basket to the cover.

The pot is provided with a dome shaped cover 13 in Figure 1 and a similar cover 14 in Figure 2. The cover of Fig. 1 is provided with a small inwardly projecting annular rib 15 the purpose of which is to deflect the fluid that comes up by percolation to cause it to fall into the grounds basket when the latter is anchored to the cover as otherwise some of this fluid would course down the inside of the cover and drop outside the grounds basket.

In Figure 2 the cover 14 is provided with a glass dome 16 of regular percolator type which avoids the use of the rib 15. A grounds carrying basket 17 of ordinary percolator form is shown in Figure 1. The preferred form of basket is indicated by 18 in Fig. 7 and this type of basket is also shown in Fig. 2. The basket of Fig. 1 has a flat bottom. The preferred basket 18 has its bottom 19 inset upward to induce the active circulation of the liquor and steam of cooking to be trapped and forced upwardly thru the basket.

The baskets of both forms are provided with close fitting foraminous cover plates 20 inset into the tops of the baskets with friction or other fits or securing devices sufficient to hold the covers on the baskets against the floating off action or bulging of the coffee grains when the basket with its contents are submerged in the liquor of the pot.

Figures 4, 5:
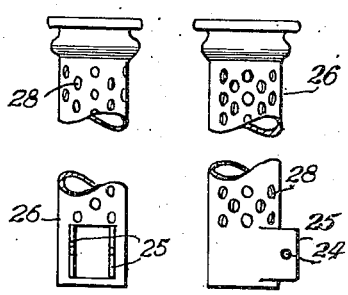
Figs. 4 and 5 show details of parts used in the anchoring mechanism in the cover as used in Fig. 1.

The basket 17 of Figure 1 is provided with a special central tube 21 having a shoulder 22 made by undercutting the body of the tube. The shoulder 22 coacts with latch 23 hinged at 24 to small flanges 25 cut and lifted from the body of a tubular projection 26 secured to the top 27 of the cover 13. This tube 26 is shown in a larger scale in Figures 4 and 5.

Perforations 28 in the tube 26 permit the flow of percolated liquor when the pot is used as a percolator. The latch 23 is connected to a rod 29 which extends outside the cover 13 whereat there is mounted a spring 30 by which the latch 23 is held into engagement with the shoulder 22 of tube 21.

I provide a percolator stem 31 composed of a tube of uniform size and having a regular percolator foot piece 33. The top of the tube 31 is closed off but below the inside of the cover of the pot and above the position of the basket when it is anchored to the cover of the pot, the tube 31 is provided with perforations 32 to allow the percolating fluid to flow out of the tube on to the basket. The tube 31 slides freely thru the basket tube 21 and the basket floats up and down on tube stem 31 and may be freely removed therefrom. The stem tube 31 is guided in a central vertical alignment in the preferred form as shown by Figure 1 by the said fixed tube 26.

In the modified form as shown by Figure 2, the tube stem 31 is guided in vertical alignment by its passing thru a hole 34 in the top of glass dome 16 and by a hole 35 in a cross bar 36 having bent up ends 37 secured by rivets 38 to the inside of the pot cover 14.

Figure 3:
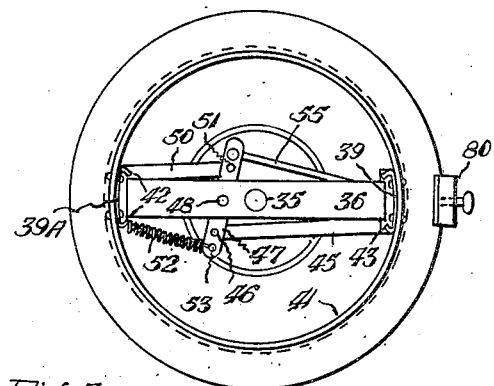
Fig. 3 is a bottom plan view of the cover as shown in Figure 2.
Figure 6:
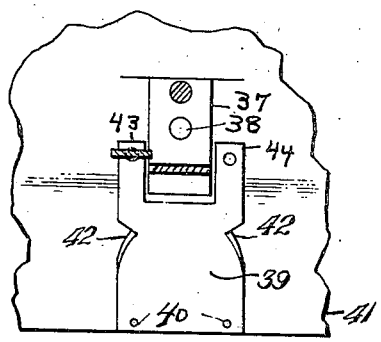
Fig. 6 is an elevational view with parts in section on line 6—6 of Fig. 2 of a detail used in the anchoring mechanism in the cover with the construction of Fig. 2.

In the modified form of Figure 2 the grounds basket 18 is anchored to the cover by plate catches 39 and 39A hinged by loosely fitting rivets 40 to the bottom or inside flange of the cover 14. The plate catches 39 and 39A are provided with engaging projections 42 made by cutting and bending out the sides of the plates. The plates 39 and 39A are cut out at their tops to straddle the cross bar 36 leaving the upstanding lugs 43 and 44. To the lug 43 of plate 39 Figures 3 and 6 there is connected a link 45 connected at its other end by a hinge pin 46 to a cross lever 47 hinged at 48 to cross bar 36. A link 50 is hinged to cross lever 47 by a pin 51 and is connected at its other end to plate 39A by a lug corresponding to lug 44. A spring 52 is connected at 53 to lever 47 and at its other end to an upstanding lug of plate 39A corresponding to lug 43. Thus the spring 52 actuates the plate catches 39 and 39A to cause their engaging projections 42 to engage underneath the curled rim 54 of basket 18 and hold or anchor the basket 18 up to the cover 14 of the pot of Figure 2 as indicated by the dotted lines of Figure 2.

The basket 18 is released from the catches 39 and 39A by a push rod 55 extending out thru the side of the pot cover 14.

When the baskets are released from their anchorage to the covers and the pot at that time is in an upright position the baskets fall by gravity down on the tubular stem into the liquor of the pot or on to the foot piece of the stem.

To bring the basket up to anchorage with the cover, the top of the stem is taken hold of and lifted carrying up the basket till it snaps into engagement with the anchoring catches whereupon the stem is pushed back down into the pot leaving the basket held by the anchors to the cover.

The modified form as shown by Figures 7 to 10 inclusive outside of the showing of the inset bottom of basket 18, relates to the anchorage for the basket and the means for guiding the percolator stem in the central vertical zone of the pot.

To guide the stem in alignment up and down approximately as desired the foot piece as shown in plan in Figure 10, indicated by 56 is provided with projections 57 thus producing a broad base which with the hole in the cover of the pot thru which the stem extends serves to hold the stem in the desired central zone of the pot.

The anchoring means for the basket in the modification as indicated in Figure 7 differs from the anchoring means of the form shown in Figure 2 by having one of the plate catches 59 fastened or fixed to the pot cover and its opposing catch 60 hinged in like manner to that of both similar catches of Figure 2. In the case of catch 60 a spring 61 acts directly to engage the catch to move to contact to the basket when the latter is raised to anchoring position to the cover. The little play or swing allowed sideways by the stem permits the basket to slip by the fixed catch 59 in the anchoring movement. The spring 61 is mounted on a rod 62 extending across and through openings on opposite sides of the cover of the pot and protrudes at 63 over the handle side which is convenient for the user to push and release the basket from the anchorage.

The top of the stems are flattened at 73 and pierced by a hole 74 and a rivet 75 aids in holding the end by the fingers of the user. The hole 74 permits the stem to be lifted by a fork tine when desired while the stem is hot.

With the tubular stems I use that act as percolator stems I provide a plug 76 that closes the top of the tube and is removably secured therein by means of a bayonet locking pin 77.

Ordinary coffee pots are provided with a pouring spout or nozzle that is outside the normal wall of the pot at the location of the spout and the wall at this point is perforated for flow to the nozzle.

With my glass pot with its outward curved top edge and a spout pinched outward in this curved edge special provision must be made to confine the liquor to go out the spout or nozzle only as when a cover is on a pot of this kind the view of the level of the liquor in pouring is obstructed and the user will usually tilt the pot up at an incline beyond the capacity of the nozzle to take and then the liquor will flow out around the edge of the curved outward top and slobber over down the side of the pot. But I guard against this by making the bottom flange of the cover curved inwardly approximately fitting the outward curve of the pot top thus confining the volume of pour to the capacity of the pinched spout or nozzle.

To hold the pot cover in place during the pouring I provide a curved clip 80 fastened to the cover and extending out over and down the side of the curved edge of the top of the pot. One of such clips will serve the purpose if it is located on the handle side of the pot or opposite the pouring spout.

In the use of the pot it can be so handled as to brew substantially any coffee flavor now obtained by the several special brewing devices now in common use.

For making what is boiled coffee the grounds are placed in the basket and the cover securely placed on the basket. The basket is then placed on the stem. The water either hot or cold is placed in the pot. The basket and stem then placed in the pot with the basket down into the water. The pot is then put on the fire directly on the flame if gas is used or on other heating element and the water boiled to suit the taste of coffee desired. When boiling is finished the upper end of the stem is taken hold of and lifted until the basket is supported by the cover. Then the stem is pushed down into the pot leaving the basket above the liquid and coffee is ready to pour.

For use as a regular percolator the grounds are placed in the basket, the basket cover applied and then the basket is put upon the stem and the stem and basket put into the pot and the pot cover applied and the basket raised and anchored to the cover and the stem pushed down to the bottom of the pot. In this form the device is a regular percolator.

To make what is known as drip coffee flavor arrange the parts the same as for percolation but do not push the stem entirely down to the bottom of the pot but let it stand up from the bottom a little ways to prevent percolating. The friction of the tube in the passage way for it will hold the stem in place against the gravity of its weight yet be easily moved by hand as desired.

The pot then with water in it either hot or cold is placed directly on the fire until the water is heated to boil. Then the basket is released by pushing the push rod that releases the anchoring means, whereupon the basket with its contents drops down into the boiling water carrying the stem also down to its lower position. The heat is then turned off or the pot removed from the fire and allowed to stand and the coffee steep in the hot water about the same length of time ordinarily required for dripping thru the drip device whereupon the stem is raised bringing the basket to anchor in the cover of the pot, the stem then pushed down to the bottom and the coffee is ready to pour having a drip flavor. The time of steeping as above determines the strength of the coffee with a given quantity of grounds.

With the boiling feature first above described, the user may by boiling more or less, which they have opportunity to observe since the pot is made of glass, make almost any coffee flavor that is possible to make with any other brewing device.

What I claim is—

1. In a pot of the class described, the combination with a foraminous grounds carrying basket of a foraminous and detachable closure, to permit the flow of liquor to the interior of said basket and prevent the escape of grounds therefrom, a central sleeve rigidly attached to said basket, a fountain tube adapted to pass through said sleeve and to permit said basket to slide freely thereon up and down within the pot into and out of the liquor in the pot while the said fountain tube is located in stable vertical position, a cover for the pot having mounted thereto anchoring means for supporting the said basket in an upward position, said fountain tube passing thru the said basket and thru the top of the cover and adapted to slide up and down thru said basket and cover, against sufficient frictional resistance to support said fountain tube and manually operated means for releasing said basket from said cover.

2. In a device of the class described, a cup shaped basket adapted to hold coffee grounds, a fountain tube engaging said basket and adapted to lift the basket from a location in the lower regions of the pot, a cover for the pot provided with a perforation in the central portion of the cover, said tube extending up thru the top of the cover; in combination with means for holding the basket up in association with the cover and above the liquor in the pot, said holding means comprising a resiliently pressed catch hinged to said cover and a manually operated catch disengaging means.

3. In a device of the class described, anchoring means for holding a grounds basket in association with the cover of the pot comprising a tube secured to the cover and extending downwardly inside the cover and provided at its lower end with a catch hinged to the tube, said catch connected to a rod extending outside the cover, a spring mounted to actuate the said rod to cause the said catch to engage a tube attached to the said basket, said catch released from the said basket by a reverse movement of the rod against the spring.

4. A device for converting a glass vessel provided with a pouring spout into a pot of the class described comprising a foraminous carrying basket provided with a central tubular sleeve, a fountain tube adapted to pass through said sleeve and to permit said sleeve to slide freely, a cover provided with a central aperture for said fountain tube and adapted to support the latter in an inoperative position, one or more resiliently pressed catches for supporting said basket in an elevated position, and manually operated means for releasing said basket from said supporting means.

5. A device for converting a vitreous vessel provided with a pouring spout into a pot of the class described comprising a foraminous carrying basket provided with a central sleeve, a fountain tube adapted to pass through said sleeve and to permit said basket to slide freely and also provided with one or more lateral perforations near its upper end, a cover provided with means for frictionally supporting said fountain tube, a resiliently pressed catch for supporting said basket in an elevated position, and means for releasing said basket from said supporting means.

6. In a device of the class described, the combination with a cover having a central opening, of a fountain tube extending through said opening, a foraminous basket adapted to be freely moved on said tube, one or more resiliently pressed catches for detachably supporting said basket from said cover when in elevated position, and a push rod carried by said cover for releasing said basket.

7. In a device of the class described, the combination with a cover having a central opening, of a fountain tube having a closed upper end and one or more lateral openings beneath the cover when said tube is in fountain operative position, a foraminous basket adapted to slide freely upon said tube as a guide, one or more resiliently pressed catches for supporting said basket in an elevated position, and means for releasing said basket from said supporting means.

8. In a device of the class described, the combination with a fountain tube provided with means for at will raising the same, a foraminous grounds carrying basket provided with a central tubular sleeve adapted to be engaged by an anchoring means and slidably mounted on said tube, a detachable cover provided with an aperture for said sleeve for retaining the coffee grains during active boiling while said basket is immersed in liquid, means for holding said fountain tube and the basket guided thereby against lateral displacement, a pot cover, a basket anchoring means carried by said pot cover adapted to co-act with said basket sleeve and manually operated means for releasing said basket.

9. In a device of the class described, a basket for holding coffee grounds, a pot cover provided with a downward projection acting as a guideway, a fountain tube held in a central position by said projection, said guideway and tube providing a centering guide for said basket, a spring actuated latch hinged to said projection adapted to engage and support said basket, and manually operated means for releasing said basket from said latch.

10. In a device of the class described, the combination with a cover having a plurality of aligned central bearings, of a foraminous basket having a central tubular guide, a fountain tube extending through said tubular guide and adapted to be frictionally held in said bearings of said cover, resiliently held means for supporting said basket in an elevated position, and manually operated means for releasing said basket from said supporting means.

11. A device for converting a glass vessel provided with a pouring spout into a pot of the class described comprising a foraminous carrying basket provided with a central tubular sleeve which sleeve has an external shoulder, a fountain tube adapted to pass through said sleeve and to permit said basket to slide freely, a foraminous cover for said basket fitting over said sleeve below said shoulder, a pot cover provided with means for automatically engaging said shoulder, and manually operated means for disengaging said basket from said support.

WILLIAM ERASTUS WILLIAMS.